(12) United States Patent
Mears (10) Patent No.: US 6,296,165 B1
(45) Date of Patent: Oct. 2, 2001

(54) MULTI-FUNCTIONAL CARRYING DEVICE (75) Inventor: Terry A. Mears, Wichita, KS (US)

(73) Assignee: Coleman Company, Inc., Wichita, KS (US)

( * ) Notice: Subject to any disclaimer, the term of this patent is extended or adjusted under 35 U.S.C. 154(b) by 0 days.

(21) Appl. No.: 09/371,260

(22) Filed: Aug. 10, 1999

(51) Int. Cl.[7] .................................................. A45F 3/02
(52) U.S. Cl. ........................ 224/610; 150/107; 150/108; 206/545; 206/549; 220/915.2; 224/148.7; 224/153
(58) Field of Search ................................... 224/610, 153, 224/148.7, 155, 585, 275; 206/541, 545, 549; 220/23.83, 23.86, 915.2, 715.2; 62/457.1, 454.4, 454.5; 150/107, 108

(56) References Cited

U.S. PATENT DOCUMENTS

| | | | |
|---|---|---|---|
| D. 158,897 | * | 6/1950 | Ruml, Jr. . |
| 4,537,313 | * | 8/1985 | Workman ............................ 206/545 |
| 4,545,414 | * | 10/1985 | Baum ................................ 150/107 X |
| 4,676,418 | * | 6/1987 | Lowe ................................... 224/638 |
| 4,796,758 | * | 1/1989 | Hauk .................................. 206/545 |
| 4,923,060 | * | 5/1990 | Breslau ............................. 206/316.2 |
| 5,234,143 | * | 8/1993 | Mahvi et al. ..................... 224/155 X |
| 5,400,610 | * | 3/1995 | Macedo ................................. 62/130 |
| 5,421,172 | * | 6/1995 | Jones ................................... 62/457.5 |
| 5,524,761 | * | 6/1996 | Wayman .............................. 206/545 |
| 5,562,228 | * | 10/1996 | Ericson ................................ 220/415 |
| 5,657,917 | * | 8/1997 | Johnson et al. ...................... 224/582 |
| 5,772,066 | * | 6/1998 | Reynolds ............................. 220/694 |
| 5,797,528 | * | 8/1998 | McDuffie .......................... 224/148.4 |
| 5,842,571 | * | 12/1998 | Rausch ................................. 206/549 |
| 5,878,672 | * | 3/1999 | Ostermann et al. ................... 108/44 |
| 5,954,170 | * | 9/1999 | Chrisholm ....................... 150/107 X |
| 5,957,349 | * | 9/1999 | Krulik ................................. 224/155 |
| 5,971,200 | * | 10/1999 | Reynolds ............................. 220/694 |
| 5,974,826 | * | 11/1999 | Baldwin et al. ........................ 62/45 |
| 5,988,476 | * | 11/1999 | Olerio ................................. 224/630 |
| 6,032,840 | * | 3/2000 | Gregory .............................. 224/275 |
| 6,047,752 | * | 4/2000 | Southwick .......................... 150/117 |
| 6,052,939 | * | 4/2000 | McClain et al. ...................... 43/54.1 |
| 6,105,844 | * | 8/2000 | Walters et al. ...................... 224/610 |
| 6,145,716 | * | 11/2000 | Caicedo .............................. 224/155 |
| 6,152,338 | * | 11/2000 | Smith ............................. 224/153 X |
| 6,614,505 | * | 12/2000 | Holter et al. ..................... 224/638 X |

* cited by examiner

Primary Examiner—Gregory M. Vidovich
Assistant Examiner—Maerena W. Brevard
(74) Attorney, Agent, or Firm—Kramer Levin Naftalis & Frankel, LLP.

(57) ABSTRACT

A multi-functional lightweight carrying device features one or more storable serving trays and beverage holders, an adjustable handle convertible to a shoulder strap, and a specialized pocket holder for a cellular phone. The device is further capable of being secured to the seat of a vehicle via a seat-belt holder.

17 Claims, 7 Drawing Sheets

MULTI-FUNCTIONAL CARRYING DEVICE

FIELD OF THE INVENTION

The present invention relates to portable carrying devices useful for storing, conveying and serving food and beverages, and in particular to soft-sided insulated coolers capable of such use.

BACKGROUND INFORMATION

Simple portable coolers formed of hard-walled metal or plastic and designed solely to maintain food and beverages at low temperatures are well known in the art. For example, hard-sided insulated containers, such as coolers and jugs, are manufactured in a variety of shapes and sizes by The Coleman Company of Wichita, Kans. Lightweight soft-sided devices which serve similar as well as additional functions such as serving food, holding beverage containers and holding a mobile or cellular telephone for easy retrieval would be desirable.

Such devices would make more convenient the conveyance of food, beverage and utensils to outdoor events such as beach outings, barbecues, picnics and football games, and at the same time would provide a convenient dining surface for serving the food and beverage. Another desired feature would be securing such a device to the seat of a car, van or truck to permit transport of the carrying device in a vehicle without danger of spillage or overturning of the contents in routine driving maneuvers.

For example, a portable carrying device modified by an attached tray would be capable of serving food by providing a table surface, thereby enhancing the utility of simple portable coolers. If further modified by a beverage holder, the cooler would then be capable of concurrently serving a beverage by securely holding a can or cup for ready consumption with the user's meal.

Such a tray and beverage holder combination could conveniently hold snacks or a sandwich while simultaneously serving drinks such as a carbonated beverage or juice, and would thus obviate the need for additional carriers and devices such as a ground cover or tarpaulin on which the food and beverage would ordinarily rest while eating and drinking. Moreover, such additional features would also maintain food and beverage well above ground level and thereby diminish the possibility of sand, dirt, crawling insects and the like contaminating the food and beverage. Therefore, such a multi-functional portable carrying device would improve the user's enjoyable and sanitary consumption of food and beverage.

SUMMARY OF THE INVENTION

Accordingly, an object of the present invention is to provide a portable carrying device which is capable of both storing, conveying and serving food and/or beverage. Thus, the present invention provides such a portable device having, for example, a base, a lid and four sidewalls including an insulative material and a liner shaped to fit the interior so as to form a food storage compartment, and also having at least one tray hingedly secured to the exterior of the food storage compartment. Optionally, in another embodiment of the present invention a beverage holder also can be hingedly secured to the exterior of the food storage compartment.

A further object of the present invention is to provide a portable device for storing, carrying and serving food which also can hold a cellular phone in a convenient manner. An embodiment of the present invention therefore provides a portable device as above described and also including a gusseted cell-phone holder which is fixedly secured to the exterior of the food storage compartment.

Another object of the present invention is to provide a portable device that is suited for steady, safe transport in an automotive vehicle. Yet another embodiment of the present invention thus provides a portable device as above described but also including a seat-belt strap for securing the device to a vehicle seat including, for example, a tether portion which is secured to the exterior of a sidewall or the base of the device, and which when held by a seat-belt can maintain the device securely on the vehicle seat.

Another object of the present invention is to provide a portable device that is suited for comfortable carriage by hand or shoulder. Thus, an embodiment of the present invention provides a single handle portion which allows for ease of conveyance by hand and ready conversion of the handle into a shoulder strap to free the user's hands for other purposes.

BRIEF DESCRIPTION OF THE DRAWINGS

The drawings will first briefly be described.

Other features and advantages of the present invention will be apparent from the following description of the exemplary embodiments thereof, and from the claims.

DETAILED DESCRIPTION

FIGS. 1, 2, 3 and 4, illustrate an exemplary embodiment of a portable carrying device 10 capable of, for example, storing, conveying and serving food and beverages. Portable carrying device 10 includes, for example, a base 11, a lid 12 and four sidewalls 13–16, including front wall 13 and back wall 14. The base, lid and sidewalls each have, for example, an exterior and interior surface, such as a nylon (e.g., wipe clean surface 210 denier nylon) or flexible plastic material.

Accordingly, the device 10 can be easily deformed (e.g., folded or flattened) for convenient storage. A thermally insulative material 70 is disposed adjacent the interior surface and joined together, for example, by an attachment at their respective adjacent edges. A liner 17 (see FIG. 4) shaped to fit interiorly within the base, lid and four sidewalls and over the thermally insulated material is fixedly attached to, for example, the interior surface, e.g., at the upper edge of the four sidewalls, so as to cover the interior surface of the sidewalls, base and lid, and thereby to form an insulated food storage compartment 18. The lid 12 is, for example, hingedly mounted to one sidewall, and is moveable between an open position and a closed position. The lid 12 covers the food storage compartment when in the closed position, for example making a sealing connection with the four sidewalls.

Figure 1:
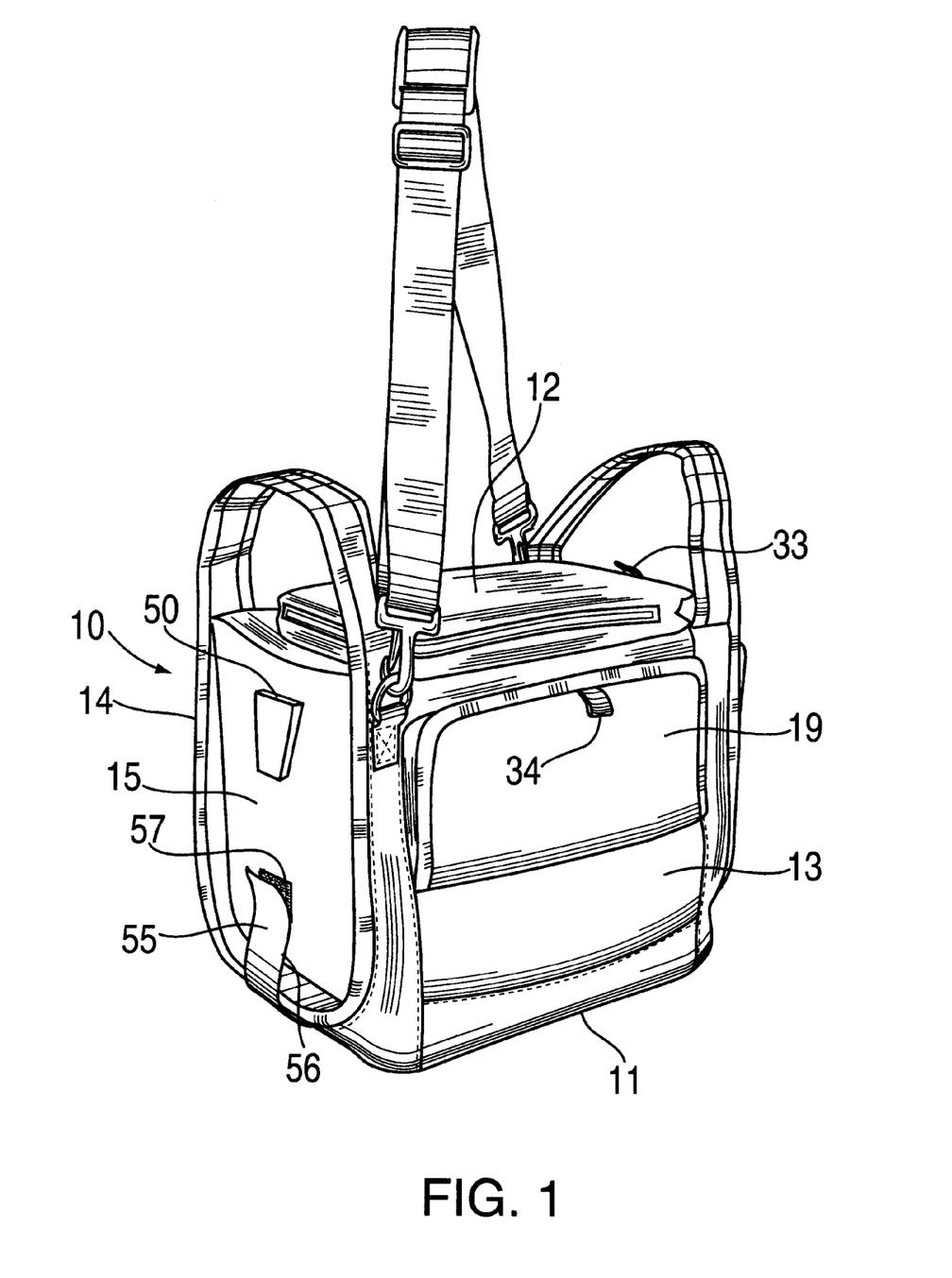
FIG. 1 is a perspective view of an exemplary portable carrying device according to an embodiment of the present invention, including a view of a seat-belt strap in a closed position and a tray in a closed position.
Figure 2:
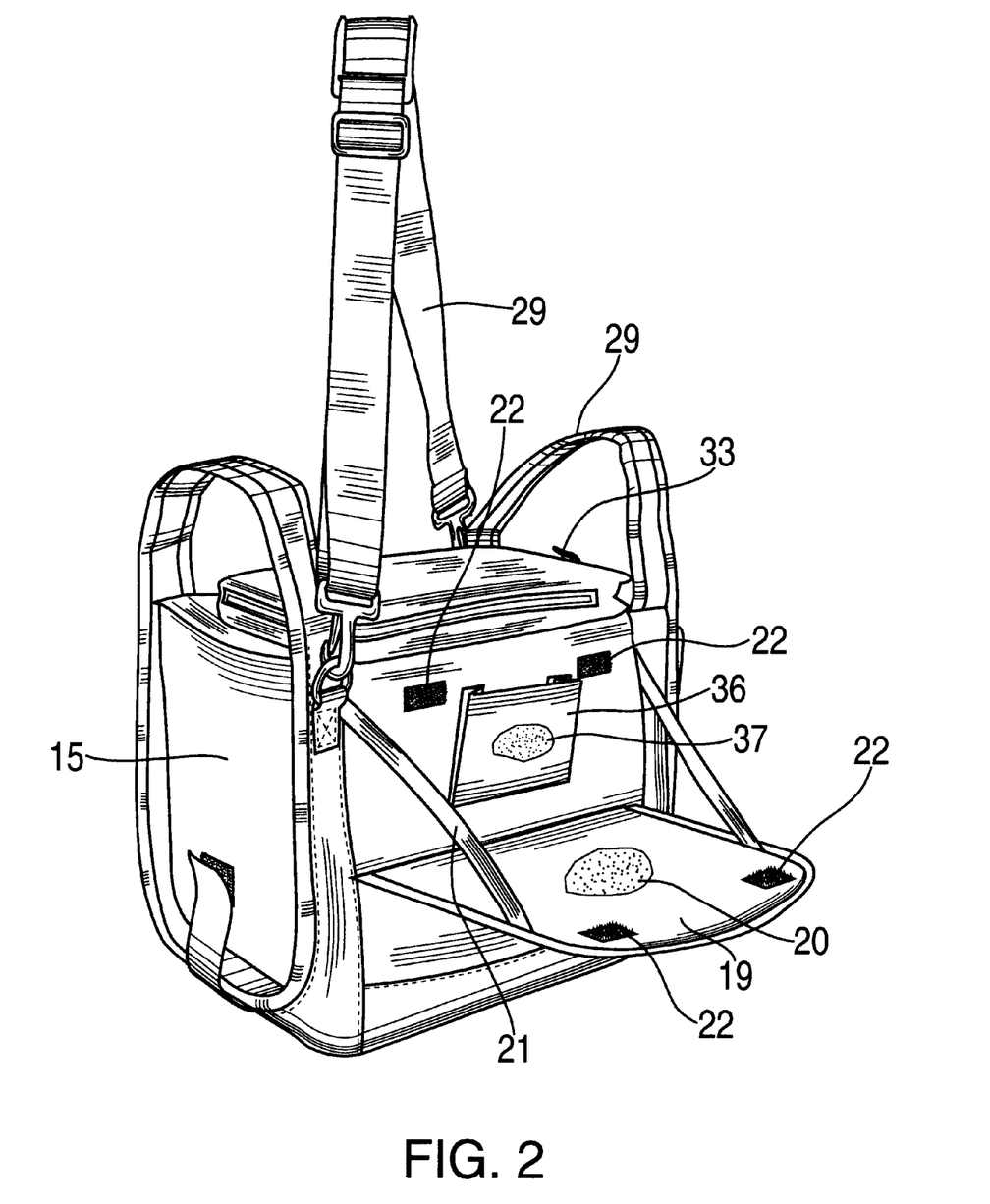
FIG. 2 is a perspective view of an exemplary portable carrying device according to an embodiment of the present invention, including a view of a tray in an open position, and cut-away-views of the tray and of a gusseted pocket.

The portable device 10 further includes, for example, at least one tray 19 hingedly secured to the exterior surface of at least one the sidewalls and adapted to pivot between a stably closed and a stably open position. The tray 19 may include, for example, a stiff flat sheet 20 (see FIG. 5) disposed between fabric material, such as the same material used for the exterior surface of the sidewalls, means 21 for fixedly securing the stiff flat sheet in the stably open position, such as fabric strips or other suitable connection material connected between tray 19 and exterior surface of wall 13, and means 22 for fixedly securing the tray in the stably closed position such as VELCRO tabs. Means 22 also may include a clasp, button, snap, zipper or other suitable fastening means. As in FIG. 1, the stiff flat sheet 20 is positioned vertically in the stably closed position so as to substantially flush with the sidewall, and, as in FIG. 2, is positioned horizontally in the stably open position so as to be substantially perpendicular to the sidewall. The tray 19, when in the horizontal stably open position, may be used, for example, to support plates, beverages, food containers, etc.

As described above, the tray 19 includes, for example, a flat sheet of a stiff material 20. The stiff material 20 is selected from, for example, a variety of materials suited to the purpose, and preferably is a sheet of cardboard or thermoplastic. The flat sheet 20 is optionally covered by a fabric, plastic coating or film which is selected from, for example, plasticized cloth, vinyl, leather or leatherette material, and the like.

The tray 19 is, for example, fixedly attached to the exterior sidewall of the portable carrying device 10 in a manner so as to be movable between open and closed positions by any effective means known in the art. Such attachment may be made, for example, by sewn stitching, riveting or welding along the edge of the tray 19 adjacent to the sidewall.

The portable carrying device 10 also includes, for example, at least one beverage holder 23 hingedly secured to a sidewall and adapted to move between a stably closed position and a stably open position. The beverage holder 23 includes, for example, at least one stiff flat sheet 24 (see FIGS. 3,4), a means 26 for fixedly securing the stiff flat sheet in the stably open position and a second means 25 for fixedly securing the stiff flat sheet in the stably closed position (see FIG. 4). The stiff flat sheet 24 may be disposed, for example, between fabric material such as the same material used for the exterior surface of the sidewalls and includes, for example, at least one cut-out ring 27 having a diameter sized to stably hold a pre-selected beverage container 28.

Figure 4:
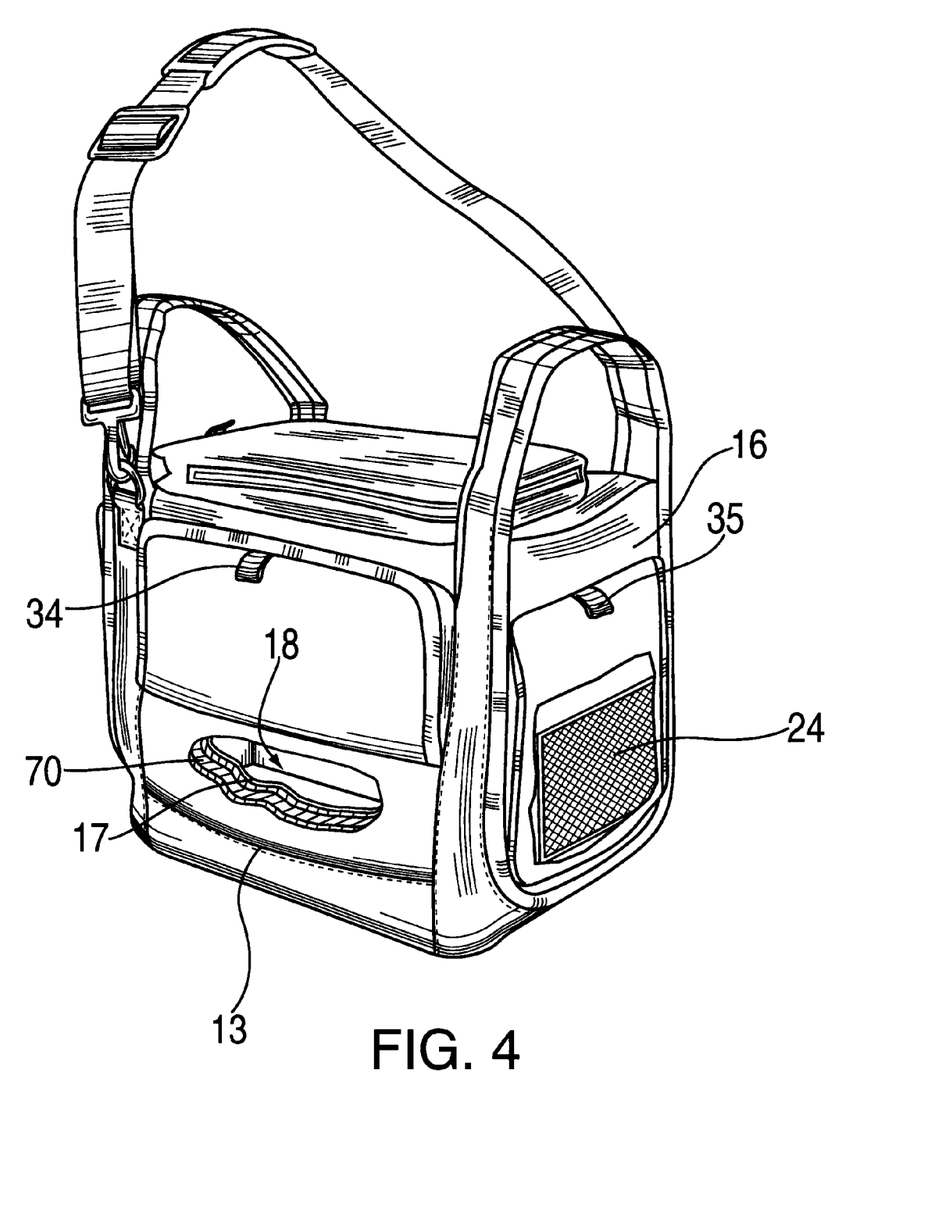
FIG. 4 is another perspective view of the exemplary portable device according to an embodiment of the present invention, and cut-away-views of the beverage holder and of a front wall.

The flat sheet 24 of beverage holder 23 is positioned vertically in the stably closed position so as to be, for example, substantially flush with the sidewall, and is positioned horizontally in the stably open position so as to be, for example, substantially perpendicular to the sidewall. Means 26 for fixedly securing the flat sheets in a stably open position may include, for example, a nylon, leather, vinyl, or leatherette cord or other suitable material. Means 25 may include for example, VELCRO tabs, button, snaps or other suitable fastening means. The beverage holder 23 may include one or more parallel flat sheets of stiff material. For example, when only one flat sheet is employed, the can or cup fits in the cut-out ring 27, hanging stably therefrom. Alternatively, two flat sheets may be employed and thus the can or cup fits in the cut-out ring 27 of the upper flat sheet and the bottom of the can or cup rests on the lower flat sheet.

The portable storage device 10 according to an embodiment of the present invention may further include, for example, means 29 for holding or carrying the portable device 10. For example, means 29 can include carrying handles 29' on opposing ends of portable device 10 and/or a shoulder strap 29", as shown in FIG. 1. Carrying handles 29' may be integrally formed with the sidewalls of device 10 or separately attached thereto. Alternatively, means 29 could include the adjustable handle illustrated in FIGS. 5–7 and described below.

In an exemplary embodiment of the portable device 10, the base, lid and sidewalls are soft and deformable. Accordingly, when the device 10 is not in use, it can be folded or otherwise minimized for ease of storage. Similarly, when in use, the device 10 can be easily manipulated (e.g., mildly deformed as needed). For example, the base, lid and sidewalls may be exteriorly covered by a material or fabric such as a waterproof textile, plasticized cloth, 210 denier nylon, vinyl, leather or leatherette, or a combination thereof. The covering also may be nylon with a vinyl trim. The insulative material may include sheets fabricated from any polymer with suitable insulative and tactile properties such as plastic foam sheet of types well known in the art. One specific material is polyurethane foam. The liner material may include, for example, a conventional plastic liner suitable for use with food products.

Figure 3:
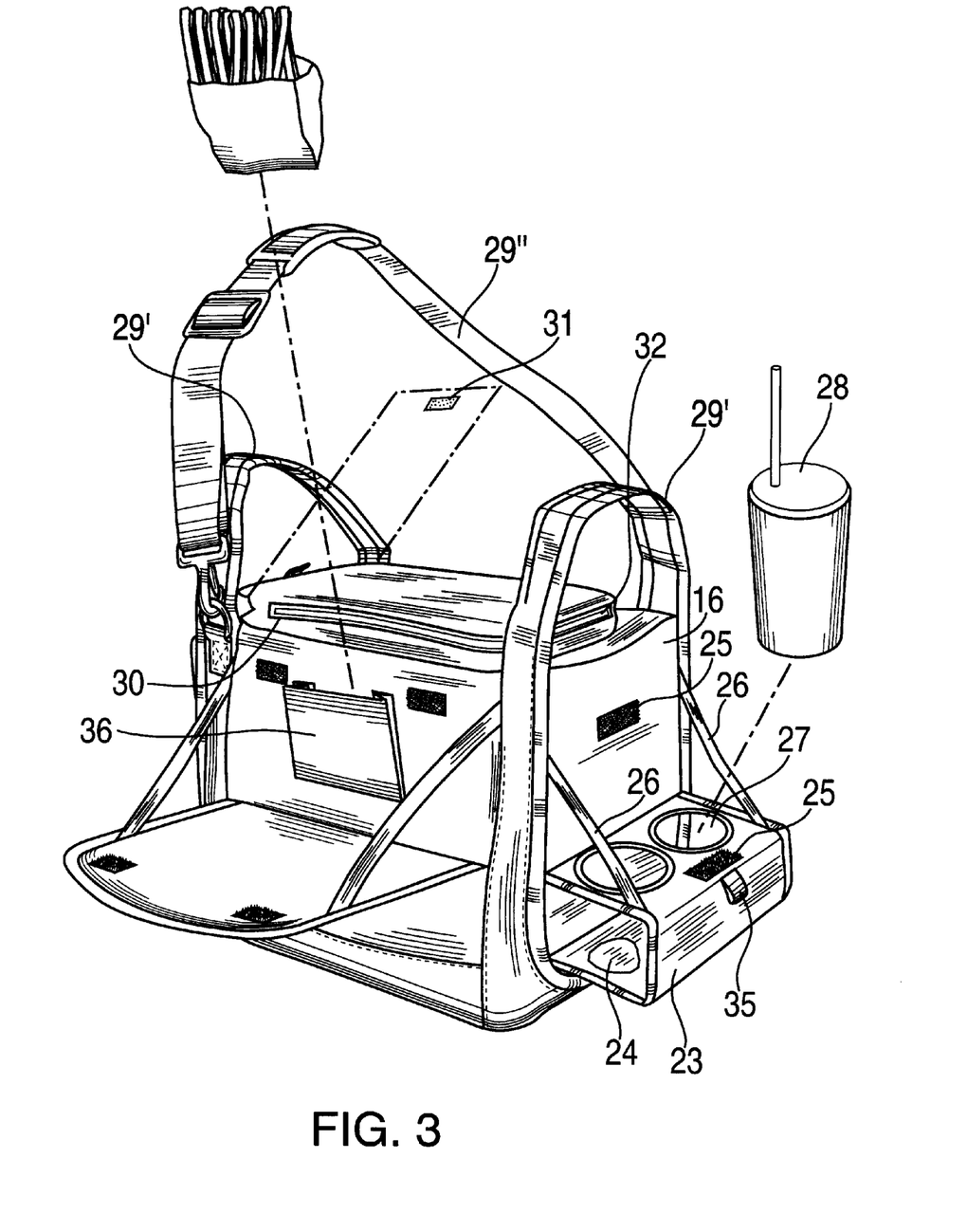
FIG. 3 is a perspective view of an exemplary portable carrying device according to an embodiment of the present invention, including a view of a tray in an open position, a view of a gussetted pocket for holding additional foodstuffs, and a view of a beverage holder in an open position with a portion thereof cut away.

In an exemplary embodiment of the portable device 10, the lid further comprises at least one fastening means 30, shown partially in FIG. 3. The lid 12 is maintained in the stably closed position by fastening means 30, either semi-permanently so as to require an unlocking step or transiently so as to require a simple displacement to open the lid. Preferably, fastening means 30 includes a velcro-type closure having a suitably sized and shaped fastener portion 31 and complementary fastener portion 32, one being fixedly attached interiorly to the lid and the other being fixedly attached exteriorly to the upper portion of the sidewall opposite the hinged mounting of the lid. This design serves to maintain the lid transiently in the stably closed position. The fastener portion 31 may include a velcro-type hook segment and the complementary fastener 32 portion may include a velcro-type loop segment. The fastener portion and complementary fastener portion may be attached to the lid or sidewall by any method known in the art, but preferably using plastic or metal rivets, stitching or adhesive.

Alternatively, the fastening means 30 can include a zipper assembly positioned substantially along the upper perimeter of the sidewalls so as to maintain the lid semi-permanently in a stably closed position. In an exemplary embodiment, the zipper assembly is of the parallel double-zipper type, wherein two zippers ride along two parallel zipper tracks running on opposite sides of the lid, thereby allowing rapid single-motion zipping and unzipping.

As illustrated in FIGS. 1 and 2, the lid has a handle 33 positioned on the exterior surface thereof opposite to the hinged mount of the lid. The handle is preferably a loop of material or fabric attached to the lid. The fabric or material is any suited to the purpose known in the art, and preferably, is nylon, leather or plastic cord, or a metal piece. Similarly, the tray 19 and the beverage holder 23 each have a handle 34 and 35, respectively, of like construction.

The sidewalls of portable device 10 are arranged, for example, in a substantially rectilinear array. Other orientations also are encompassed by the present invention. The attachment of the base, lid and sidewalls may be by any means known in the art suited for the purpose, such as sewn stitching or stapling or integral construction.

The stiff flat sheet 20 or stiff flat sheet 24 may be fabricated from a variety of suitable materials all well known in the art, such as high-density plastic sheeting or cardboard, and is preferably made from polyethylene or polypropylene board.

In an exemplary embodiment of the present invention, the beverage holder 23 includes two cut-out rings 27. The cut-out rings may be sized, for example, to fit commercially available bottle, cup or can sizes, and have commonly a diameter of about 2 inches to about 4 inches. Preferably, the cut-out rings have a diameter of about 2.5 inches.

In an exemplary embodiment, the present invention may also include at least one gusseted pocket 36 suitable for holding foodstuffs, such as an individual bag of french fries or onion rings. The pocket 36 is, for example, fixedly attached to the exterior surface of a sidewall and adapted to open a sufficient amount to receive and support foodstuffs between the exterior surface and the pocket material. The pocket 36 includes, for example, a suitably shaped flat sheet 37 positioned vertically so as to be substantially flush with the sidewall and capable of being positioned angularly so as to be oblique to the sidewall via the gussets on the side of the pocket 36 when the pocket is in use.

The gusseted pocket 36 may be positioned anywhere desired on a sidewall, such as substantially centrally on a sidewall if on a sidewall lacking a tray 19. When not in use, the pocket 36 could be covered by tray 19 in the closed position. The suitably shaped flat sheet 37 may include various materials known in the art such as used for the lid, base and sidewalls, but is preferably nylon or plasticized cloth.

In another exemplary embodiment, the portable carrying device 10 further includes a gusseted cell-phone holder 50, which is attached, for example, to the exterior of one sidewall. Similar to the pocket 36, the cell-phone holder includes, for example, a suitably dimensioned gusseted pocket fixedly secured to the exterior of a sidewall.

The portable carrying device 10 may further include, for example, a seat-belt strap 55 for securing the device 10 to a vehicle seat. The seat-belt strap 55 includes, for example, a tether portion 56 which is attached to the exterior of a sidewall or to the base and is adapted to open and close with respect to the exterior surface to receive a seat belt. The seat-belt strap further includes, for example, means 57 for securing the tether portion in the closed position, such as VELCRO, hooks, snaps, buttons or other suitable fastening means. Means 57 for fixedly securing the tether portion in the closed position may include, for example, a fastener portion and a complementary fastener portion, which are attached respectively to the tether portion and the sidewall. The fastener portion preferably includes a velcro-type hook segment and the complementary fastener portion preferably includes a velcro-type loop segment, located on the sidewall adjacent to the fixed securement of the tether portion such that the tether portion is flush with the sidewall in the closed position. The tether portion, the fastener portion and the complementary fastener portion are each attached to the sidewall or base by means known in the art, such as with plastic or metal rivets, stitching or adhesive. The tether portion 56 is suitably dimensioned so as to maintain the device 10 securely on the automotive vehicle seat.

Figure 5:
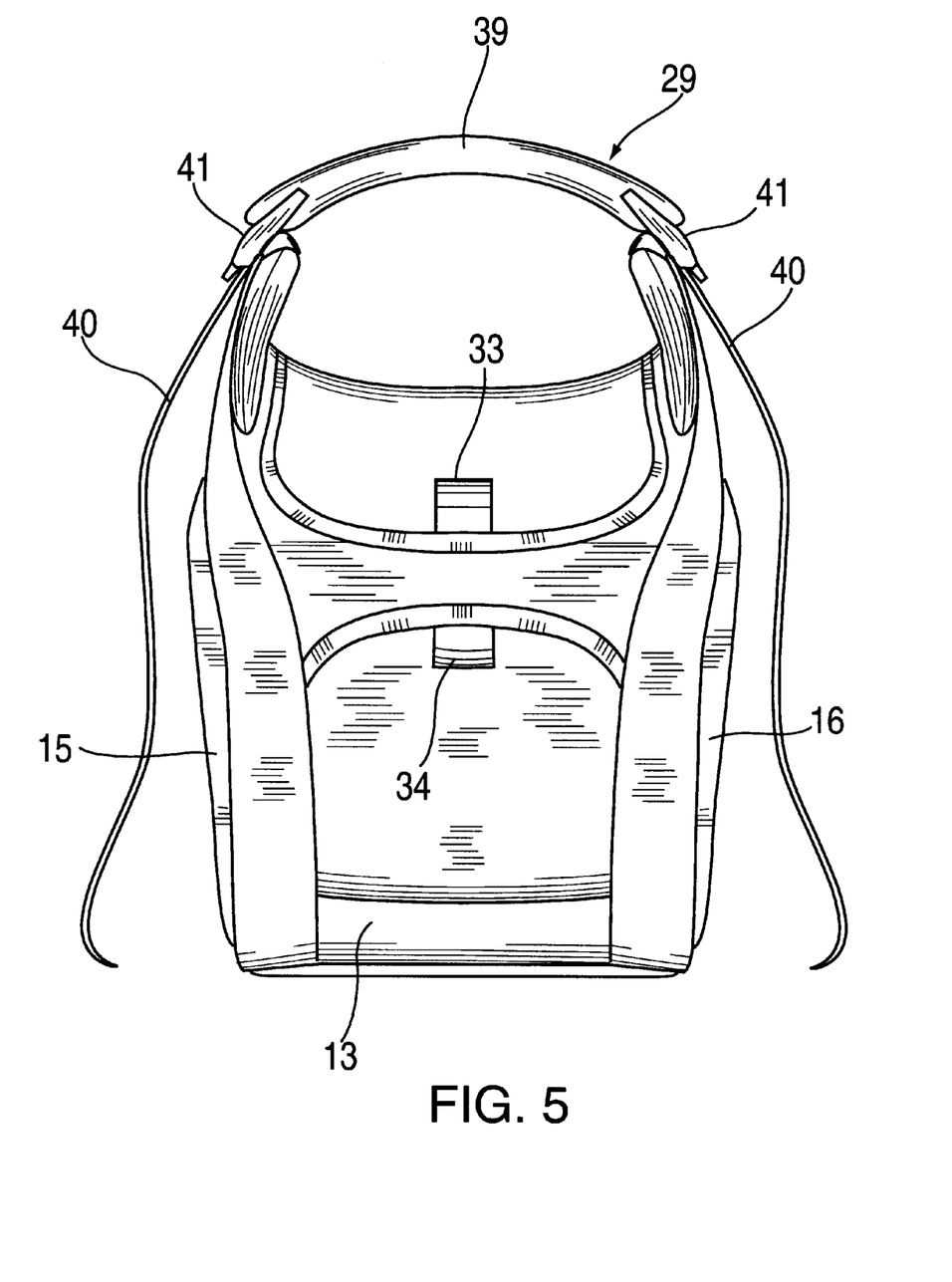
FIG. 5 is a front view of an exemplary portable carrying device according an embodiment of the present invention including an adjustable carrying strap in a hand bag position.
Figure 6:
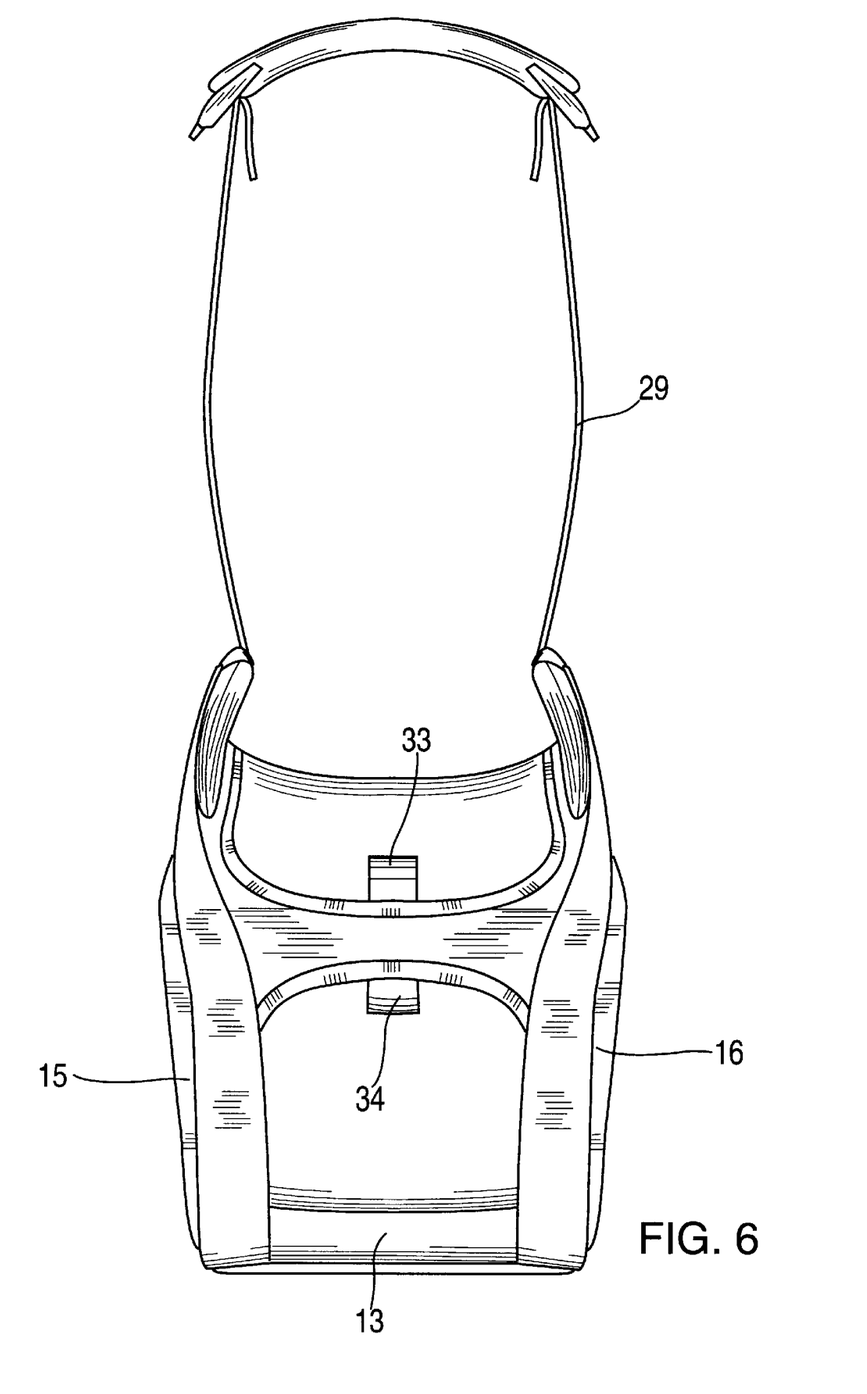
FIG. 6 is a front view of an exemplary portable carrying device according an embodiment of the present invention including an adjustable carrying strap in a shoulder strap position.
Figure 7:
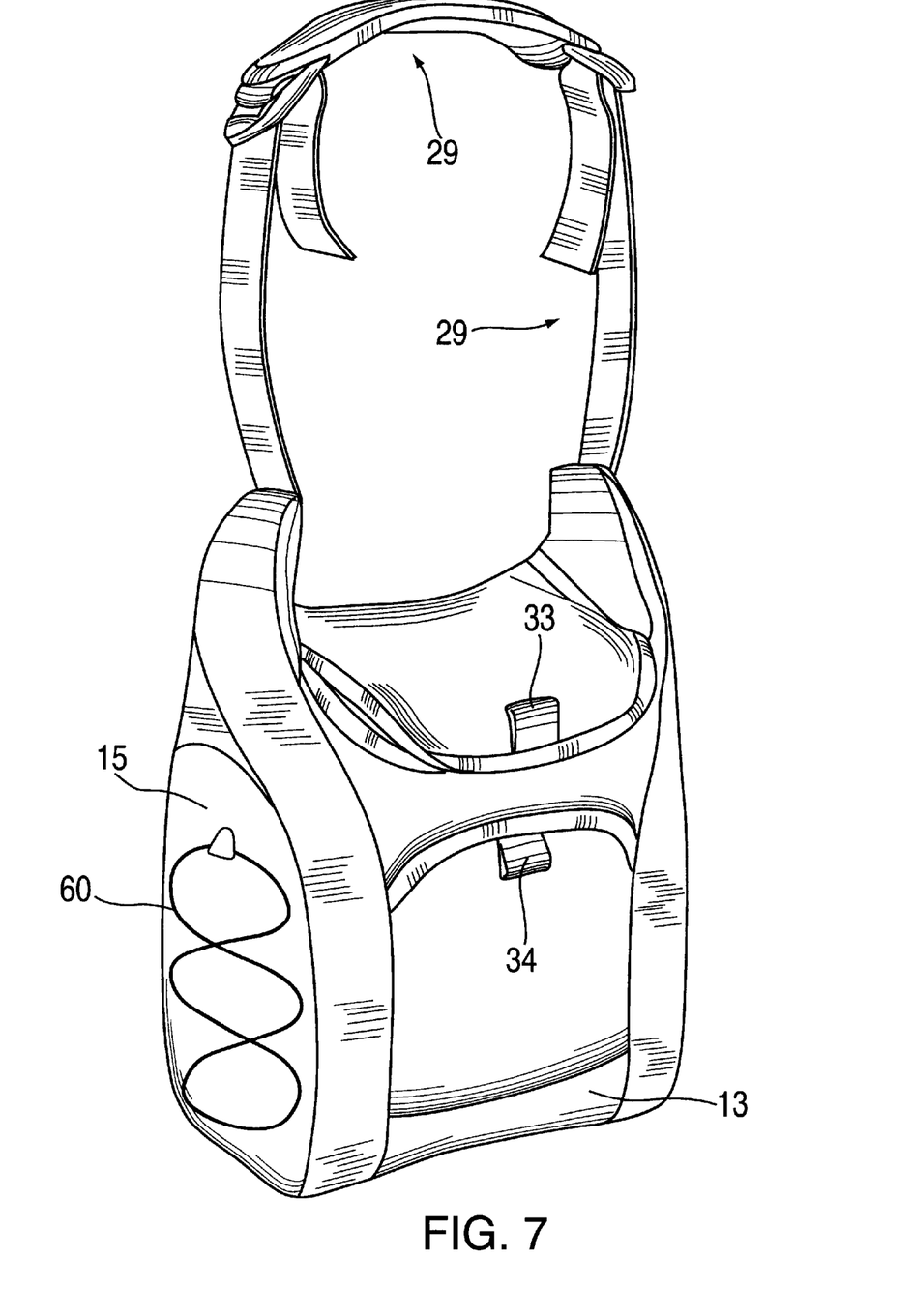
FIG. 7 is a perspective view of an exemplary portable carrying device according an embodiment of the present invention including an adjustable carrying strap in an intermediate position.

As illustrated in FIGS. 5–7, a telescoping handle 39 may be connected to a portable device 10 according to an exemplary embodiment of the present invention. For example, adjustable straps 40 permit the handle 39 to move between a handbag position (see FIG. 5) and a shoulder bag position (see FIG. 7) or anywhere in between these positions (see FIG. 6). Such an adjustable strap avoids the need to have two separate handle systems as is common in the prior art (e.g., one lifting handle(s) and a separate shoulder strap).

The adjustable straps 40 are, for example, fixedly or removably attached to opposite sidewalls of the device 10. In an alternative embodiment, a continuous strap could be used. The adjustable shoulder straps 40 removably attach to handle 39 by, for example, ladder lock clips 41 or other suitable adjustable clips, as are known in the art. Another portion of ladder clip 41 attaches to an end of handle 39. For example, one end of the straps 40 may be permanently affixed to a sidewall while the other end of the strap 40 is adjustable with respect to an end of handle 39 via clip 41. Suitable materials for the adjustable straps 40 and handle 39 may include leather, vinyl, waterproof cloth or leatherette. An optional handle covering may be provided on handle 39 for comfort of the user.

In a further exemplary embodiment illustrated in FIG. 7, a sidewall of the carrying device 10 may include a harness 60, such as a bungee cord or other extensible cord-like material, to permit additional articles to be secured against the exterior surface of the sidewall(s). The supplemental carrier 60 can provide, for example, increased transporting capacity for items which do not require temperature control.

What is claimed is:

1. A portable carrying device comprising:
   a flexible storage portion having a moveable access opening cover, the storage portion having an inner surface and an outer surface, an insulating material being disposed between the inner surface and the outer surface substantially throughout the storage portion;
   at least one tray movably connected to and covering a portion of the outer surface of the storage portion, the at least one tray being moveable between a closed position adjacent the outer surface and an open position extending from the outer surface, wherein moving the tray from the closed position to the open position exposes the portion of the outer surface covered by the tray in the closed position; and
   at least one beverage holder movably connected to the outer surface of the storage portion, the at least one beverage holder being moveable between a closed position adjacent the outer surface and an open position extending from the outer surface, wherein when the at least one beverage holder is in the open position, a predetermined beverage container can be supported adjacent the outer surface by the at least one beverage holder.

2. The portable carrying device according to claim 1, wherein the moveable access opening cover includes a releasably engageable lid providing a sealing connection to an interior cavity of the storage portion.

3. The portable carrying device according to claim 1, wherein the at least one tray includes a stiff bottom portion movably connected to the outer surface.

4. The portable carrying device according to claim 1, wherein the at least one beverage holder includes an upper portion and a stiff lower portion, the upper portion having an opening through which the predetermined beverage container is disposed, a bottom of the pre-determined beverage container being supported by the stiff lower portion.

5. The portable carrying device according to claim 1, further comprising:
a mobile phone pocket attached to the outer surface, the mobile phone pocket supporting a mobile phone adjacent the outer surface.

6. The portable carrying device according to claim 1, further comprising a seat-belt holder connected to a lower portion of the outer surface, the seat belt holder providing a releasably engageable connection between the storage portion and the seat belt of a vehicle to maintain the storage portion in an upright position.

7. The portable carrying device according to claim 1, further comprising at least one handle connected to the exterior surface of the storage portion.

8. The portable carrying device according to claim 7, wherein the at least one handle includes two lifting handles.

9. The portable carrying device according to claim 7, wherein the at least one handle includes an adjustable shoulder strap.

10. A portable carrying device comprising:
a flexible storage portion having a moveable access opening cover, the storage portion having an inner surface and an outer surface, an insulating material being disposed between the inner surface and the outer surface substantially throughout the storage portion;
at least one tray movably connected to and covering a portion of the outer surface of the storage portion, the at least one tray being moveable between a closed position adjacent the outer surface and an open position extending from the outer surface, wherein moving the tray from the closed position to the open position exposes the portion of the outer surface covered by the tray in the closed position; and
at least one gusseted pocket attached to the exterior surface of the storage portion, the at least one gusseted pocket being covered when the at least one tray is in the closed position.

11. A portable carrying device comprising
a flexible storage portion having a moveable access opening cover, the storage portion having an inner surface and an outer surface, an insulating material being disposed between the inner surface and the outer surface substantially throughout the storage portion; and
an adjustable handle assembly connected to the outer surface of the storage portion, the adjustable handle being adjustable between a first handbag position and a second shoulder bag position;
wherein the adjustable handle assembly includes:
a first strap having one end connected to the outer surface of the storage portion;
a second strap having one end connected to the outer surface of the storage portion; and
a handle portion adjustably connected to a free end of the first strap and a free end of the second strap via a first connector and a second connector, respectively.

12. The portable carrying device according to claim 11, wherein the first connector and the second connector include a ladder-lock clip.

13. A portable carrying device comprising:
a flexible storage portion having a moveable access opening cover, the storage portion having an inner surface, an outer surface, and an insulating material being disposed between the inner surface and the outer surface substantially throughout the storage portion;
at least one tray movably connected to and covering a portion of the outer surface of the storage portion, the at least one tray being moveable between a closed position adjacent the outer surface and an open position extending from the outer surface, the at least one tray including a stiff bottom portion movably connected to the outer surface, wherein moving the tray from the closed position to the open position exposes the portion of the outer surface covered by the tray in the closed position;
an adjustable handle assembly connected to the outer surface of the storage portion, the adjustable handle assembly being adjustable between a first handbag position and a second shoulder bag position; and
at least one gusseted pocket attached to the exterior surface of the storage portion, the at least one gusseted pocket being covered when the at least one tray is in the closed position.

14. The portable carrying device according to claim 13, wherein end moveable access opening cover includes a releasably engageable lid providing a sealing connection to an interior cavity of the storage portion.

15. The portable carrying device according to claim 13, further comprising a mobile phone pocket attached to the outer surface, the mobile phone pocket supporting a mobile phone adjacent the outer surface.

16. The portable carrying device according to claim 13, further comprising a seat-belt holder connected to a lower portion of the outer surface, the seat belt holder providing a releasably engageable connection between the storage portion and the seat belt of a vehicle to maintain the storage portion in an upright position.

17. A portable carrying device comprising:
a flexible storage portion having a moveable access opening cover, the storage portion having an inner surface, an outer surface, and an insulating material being disposed between the inner surface and the outer surface substantially throughout the storage portion;
at least one tray movably connected to and covering a portion of the outer surface of the storage portion, the at least one tray being moveable between a closed position adjacent the outer surface and an open position extending from the outer surface, the at least one tray including a stiff bottom portion movably connected to the outer surface, wherein moving the tray from the closed position to the open position exposes the portion of the outer surface covered by the tray in the closed position;
an adjustable handle assembly connected to the outer surface of the storage portion, the adjustable handle assembly being adjustable between a first handbag position and a second shoulder bag position; and
at least one beverage holder movably connected to the outer surface of the storage portion, the at least one beverage holder being moveable between a closed position adjacent the outer surface and an open position extending from the outer surface, wherein when the at least one beverage holder is in the open position, a predetermined beverage container can be supported adjacent the outer surface by the at least one beverage holder, and wherein the at least one beverage holder includes an upper portion and a stiff lower portion, the upper portion having an opening through which the predetermined beverage container is disposed, a bottom of the pre-determined beverage container being supported by the stiff lower portion.

* * * * *